(12) United States Patent
Hughes

(10) Patent No.: US 10,309,780 B1
(45) Date of Patent: Jun. 4, 2019

(54) LASER MEASURING DEVICE

(71) Applicant: Walcott Hughes, St Albans, NY (US)

(72) Inventor: Walcott Hughes, St Albans, NY (US)

( * ) Notice: Subject to any disclaimer, the term of this patent is extended or adjusted under 35 U.S.C. 154(b) by 257 days.

(21) Appl. No.: 15/437,510

(22) Filed: Feb. 21, 2017

Related U.S. Application Data

(60) Provisional application No. 62/299,793, filed on Feb. 25, 2016.

(51) Int. Cl.
*G01C 15/10* (2006.01)

(52) U.S. Cl.
CPC .................... *G01C 15/105* (2013.01)

(58) Field of Classification Search
CPC ...... G01B 11/14; G01C 15/10; G01C 15/105; B25H 7/00; B25H 7/005
USPC .............................................. 33/286, DIG. 21
See application file for complete search history.

(56) References Cited

U.S. PATENT DOCUMENTS

| | | | | |
|---|---|---|---|---|
| 6,314,650 B1 * | 11/2001 | Falb | ...................... | G01C 15/004 33/286 |
| 6,373,579 B1 * | 4/2002 | Ober et al. | ........... | G01B 11/002 250/559.38 |
| 6,747,747 B2 * | 6/2004 | Hipp | ....................... | G01S 17/42 250/221 |
| 7,363,716 B1 * | 4/2008 | Tonkinson et al. | .... | A47G 1/205 33/286 |
| 7,367,129 B2 * | 5/2008 | Lu | ......................... | G01C 15/002 33/286 |
| 7,497,018 B2 * | 3/2009 | Hersey | ................. | G01C 15/004 33/281 |
| 7,866,052 B2 * | 1/2011 | Schulze | ................. | G01C 15/02 33/1 G |
| 8,319,950 B2 * | 11/2012 | Snyder | ....................... | G01S 7/51 356/3.01 |
| 8,482,721 B2 * | 7/2013 | Snyder | ...................... | G01S 7/51 356/3.01 |
| 8,516,713 B2 * | 8/2013 | Carl | ...................... | G01B 3/1041 33/760 |
| 9,217,630 B2 * | 12/2015 | Meinherz et al. | ...... | F16P 3/144 |
| 2006/0075867 A1 * | 4/2006 | Etter et al. | ........... | B23D 59/002 83/522.11 |
| 2006/0113985 A1 * | 6/2006 | Gist | .......................... | A45F 5/02 324/67 |
| 2006/0196059 A1 * | 9/2006 | Berto | ................... | G01C 15/008 33/286 |
| 2008/0123112 A1 * | 5/2008 | Marsh et al. | .......... | G01C 11/02 356/625 |
| 2010/0020337 A1 * | 1/2010 | Robichaud et al. | ... | G01B 11/14 356/621 |
| 2010/0315801 A1 * | 12/2010 | Wu et al. | ................ | F21S 6/003 362/33 |
| 2011/0288812 A1 * | 11/2011 | Thierman et al. | ... | G01B 11/002 702/141 |

* cited by examiner

*Primary Examiner* — Yaritza Guadalupe-McCall

(57) ABSTRACT

The laser measuring device is a portable, battery-operated laser measuring tool that projects a plurality of illuminated dots when activated. The plurality of illuminated dots are arranged in a straight line and the laser measuring tool can be positioned so that the spacing between adjacent illuminated dots is 16 inches or 24 inches. The laser measuring tool can be aimed at a wall, floor, lumber or other object upon which it is desirable to have a plurality of evenly spaced illuminated dots projected.

14 Claims, 10 Drawing Sheets

LASER MEASURING DEVICE

CROSS REFERENCES TO RELATED APPLICATIONS

This non-provisional patent application claims the benefit of priority from U.S. Provisional Application Ser. No. 62/299,793, filed on Feb. 25, 2016, the entire contents of which are incorporated herein by reference.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of laser devices, more specifically, a battery-powered laser which can be set on the floor or a wall and used to provide accurate plumb measurements.

Many carpenters struggle when needing to take accurate measurement while working alone. When using a conventional measuring tape, the end of the measuring tape tends to slip off of a piece of wood unless there is someone to hold the end in place when the tape measure is stretched out. Laser measuring devices are easier to use in these situations, but they are not very accurate, especially when needing plumb measurements on 16" and 24" centers. Therefore a need exists for a specially designed new laser measuring tool to provide accurate plumb measurements on 16" and 24" centers. This will make adding studs and supports for windows and door much easier for carpenters working without assistance.

SUMMARY OF INVENTION

The laser measuring device is a portable, battery-operated laser measuring tool that projects a plurality of illuminated dots when activated. The plurality of illuminated dots are arranged in a straight line and the laser measuring tool can be positioned so that the spacing between adjacent illuminated dots is 16 inches or 24 inches. The laser measuring tool can be aimed at a wall, floor, lumber or other object upon which it is desirable to have a plurality of evenly spaced illuminated dots projected.

An object of the invention is to provide a battery-powered laser measuring tool which can be set on the floor or on a wall and used to provide accurate plumb measurements.

A further object of the invention is to provide a laser measuring tool that can designate both 16 inch centers and 24 inch centers.

These together with additional objects, features and advantages of the laser measuring device will be readily apparent to those of ordinary skill in the art upon reading the following detailed description of the presently preferred, but nonetheless illustrative, embodiments when taken in conjunction with the accompanying drawings.

In this respect, before explaining the current embodiments of the laser measuring device in detail, it is to be understood that the laser measuring device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the laser measuring device.

It is therefore important that the claims be regarded as including such equivalent construction insofar as they do not depart from the spirit and scope of the laser measuring device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
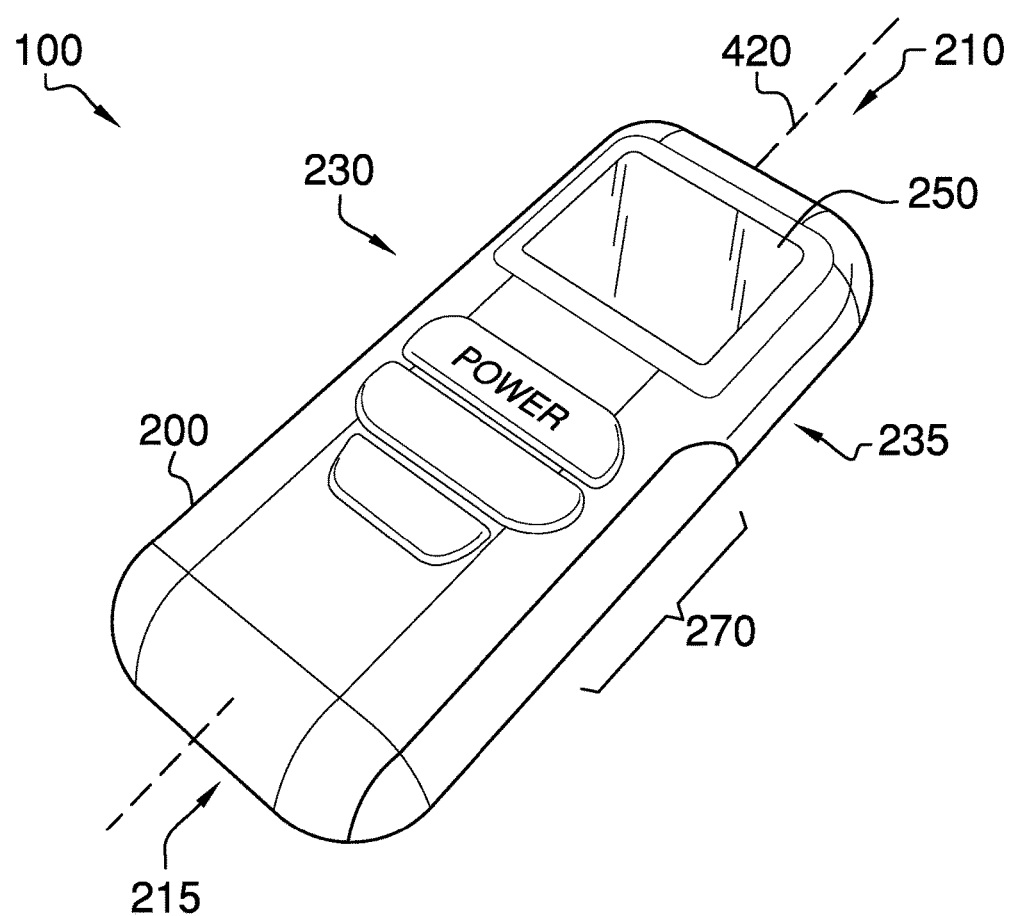
FIG. 1 is a perspective view of an embodiment of the disclosure.
Figure 2:
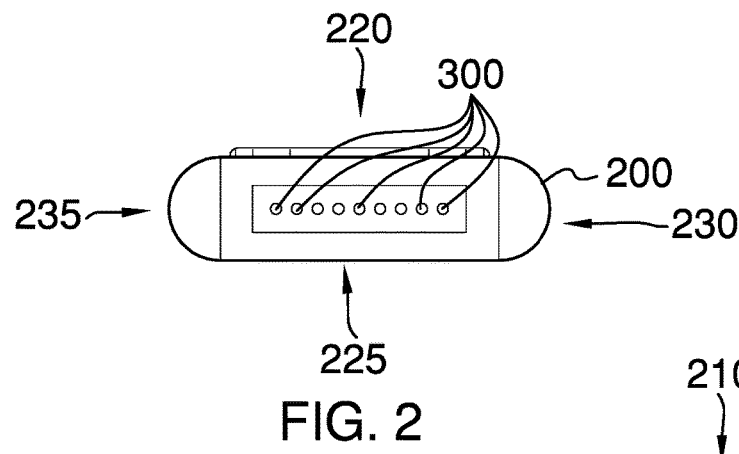
FIG. 2 is a front view of an embodiment of the disclosure.
Figure 3:
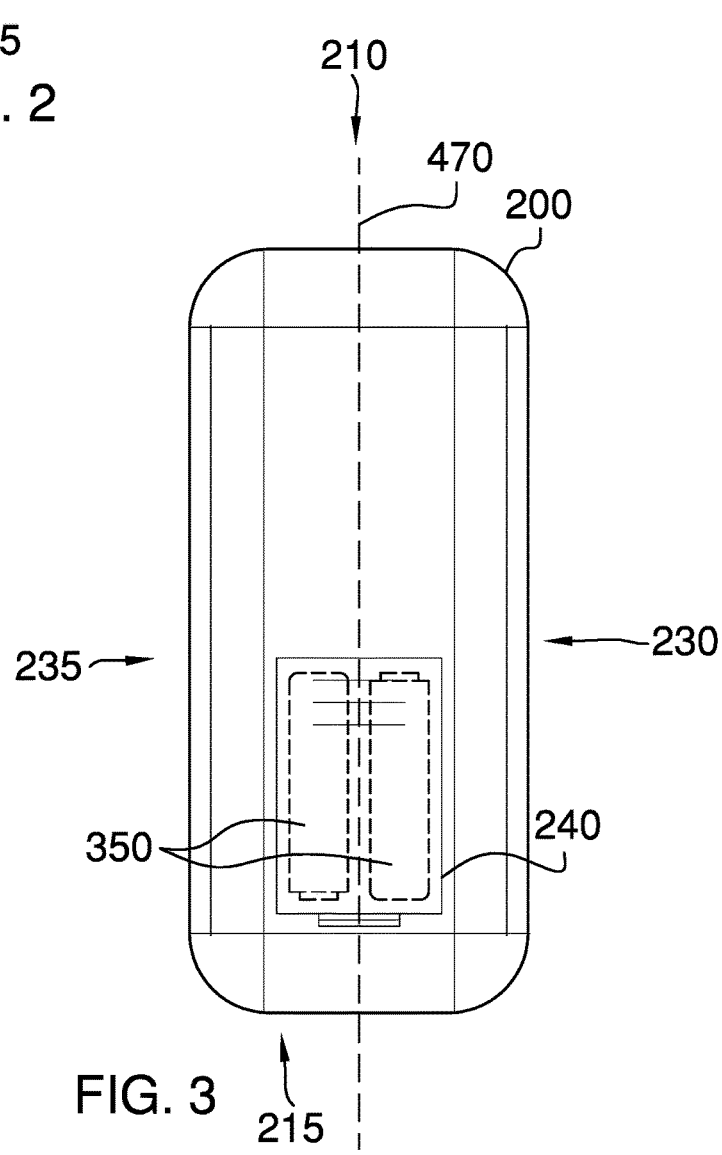
FIG. 3 is a bottom view of an embodiment of the disclosure.
Figure 4:
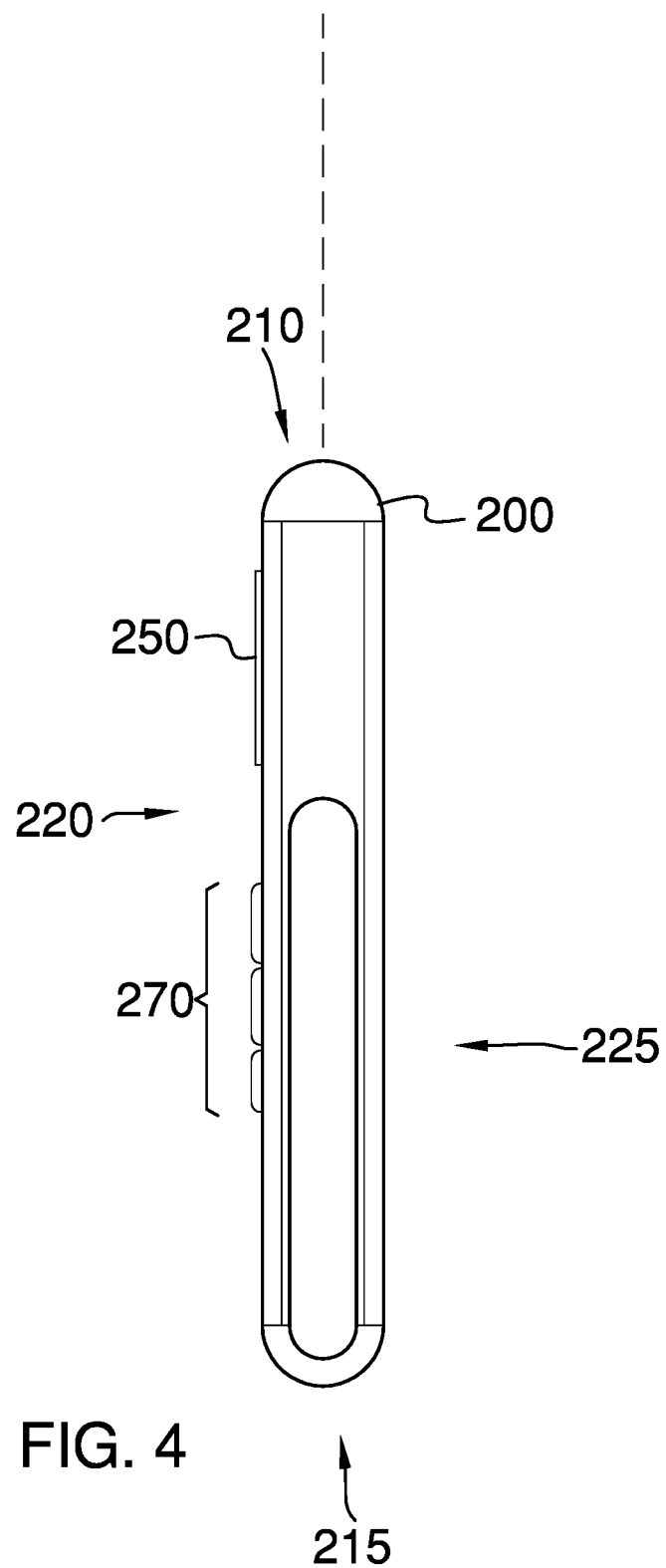
FIG. 4 is a side view of an embodiment of the disclosure.
Figure 5:
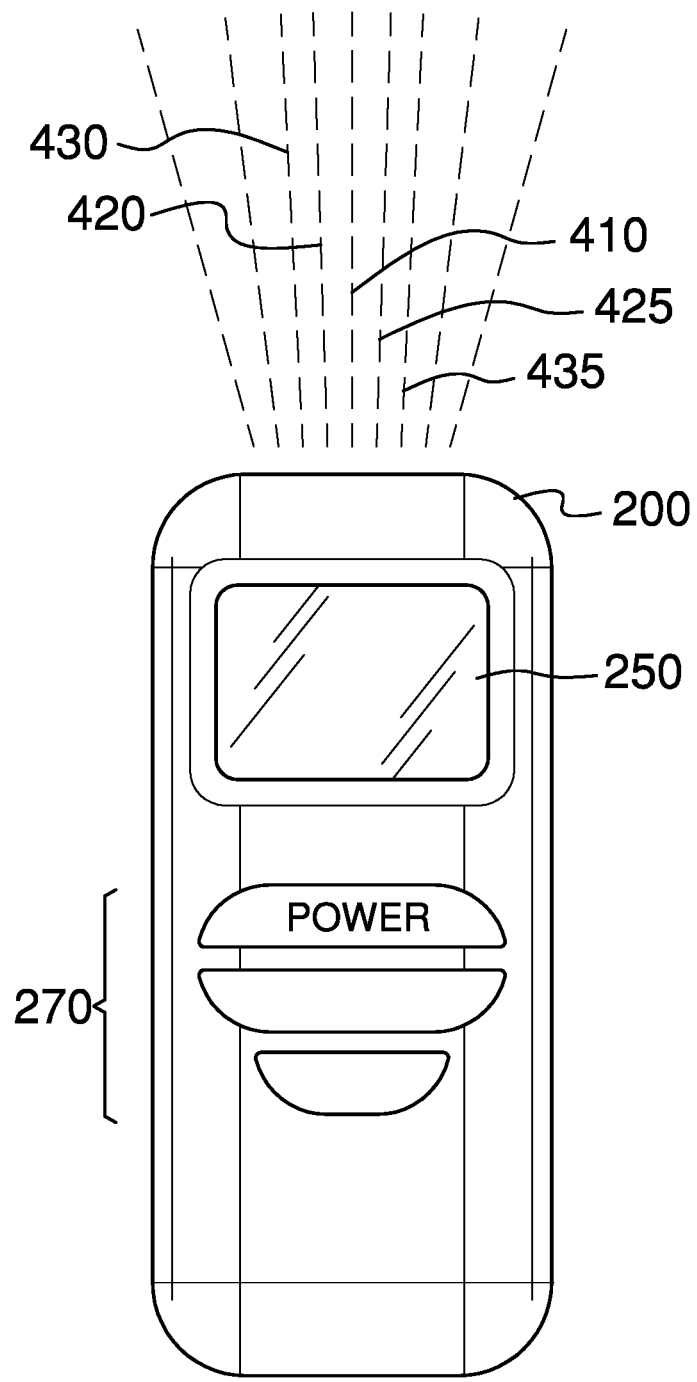
FIG. 5 is a top view of an embodiment of the disclosure.
Figure 6A:
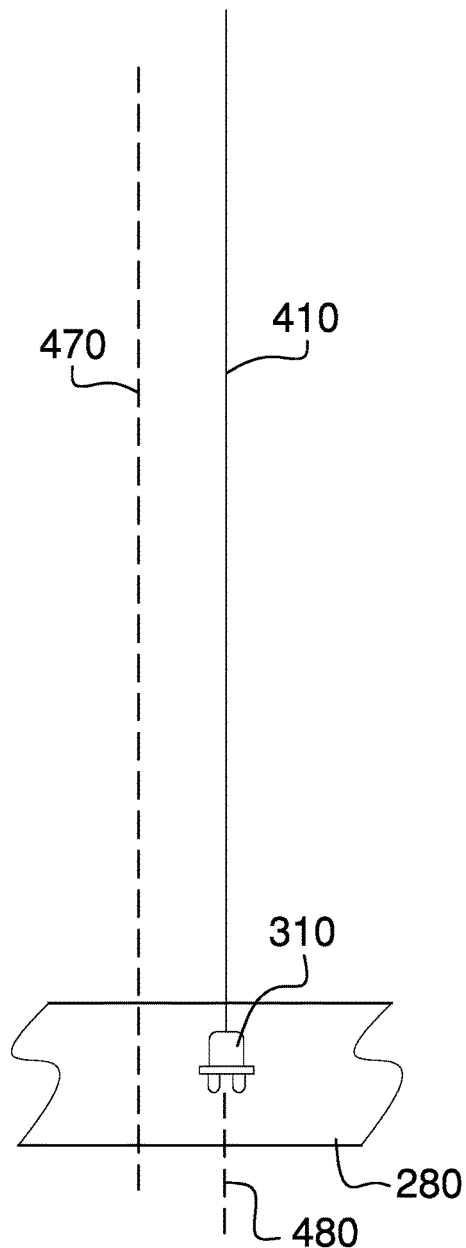
FIG. 6A is a detail view illustrating a laser diode with a yaw angle of zero degrees consistent with an embodiment of the disclosure.
Figure 6B:
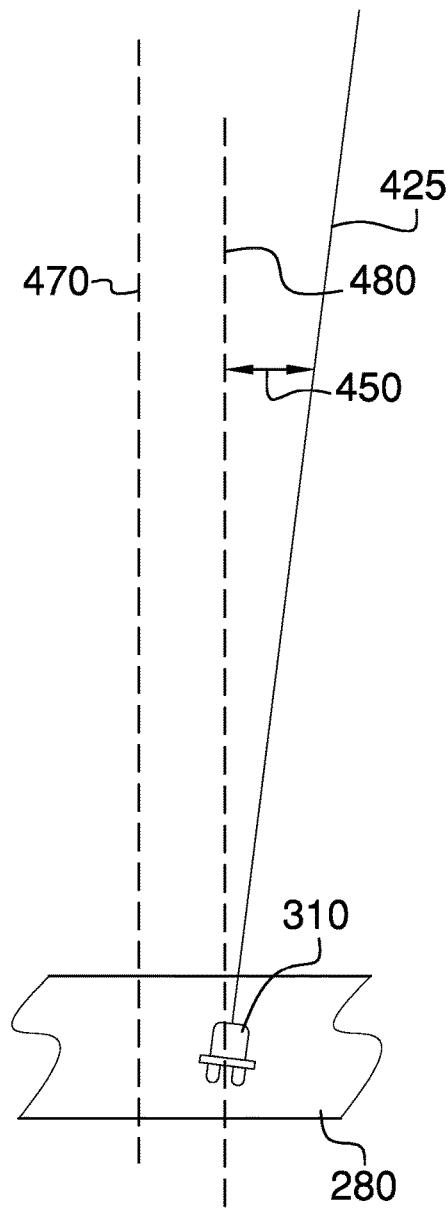
FIG. 6B is a detail view illustrating a laser diode with a non-zero degree yaw angle consistent with an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the word "control" is intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. As used herein, the word "coupled", means connected, either directly or indirectly; the word coupled does not necessarily imply a mechanical connection.

Detailed reference will now be made to a first potential embodiment of the disclosure, which is illustrated in FIGS. 1 through 8.

The laser measuring device 100 (hereinafter invention) comprises a plurality of laser diodes 300, an operational control 250, one or more batteries 350 and a housing 200. When the invention 100 is activated by depressing the operational control 250, the plurality of laser diodes 300 projects a plurality of illuminated dots 400 onto a wall 900 that the invention 100 is aimed towards. With the invention 100 positioned correctly, the plurality of illuminated dots 400 will define a straight, level line, and the plurality of illuminated dots 400 will be equally separated by a desired spacing of illuminated dots 500.

The plurality of laser diodes 300 are mounted onto a circuit board 280 within the housing 200 at a front side 210 of the invention 100 in a straight line extending from a left side 230 of the housing 200 to a right side 235 of the housing 200. For each of the plurality of laser diodes 300, an individual laser diode 310 is set at a yaw angle 450 so that the plurality of illuminated dots 400 projected by the plurality of laser diodes 300 strike specific and predictable locations on the wall 900. Although reference is frequently made in this specification to the invention 100 being aimed at or pointed towards the wall 900, it should be known that the invention 100 may be aimed at any object upon which it is desired to show the plurality of illuminated dots 400 of equal spacing. As non-limiting examples, the invention 100 may be used to project the plurality of illuminated dots 400 of equal spacing onto floors, lumber, plywood panels, or sheets of drywall.

The yaw angle 450 of each laser beam is measured with respect to a front to back centerline 470 of the invention 100. Specifically, the yaw angle 450 of the individual laser diode 310 is defined to be the angle at which a laser beam leaving the individual laser diode 310 diverges in a left/right direction from a line parallel to the centerline 480 and when the line parallel to the centerline 480 passes through the individual laser diode 310 (See FIG. 6.)

In order for the plurality of illuminated dots 400 projected by the invention 100 to strike specific and predictable locations, certain conditions regarding the placement and orientation of the invention 100 must be true. The first condition is that a distance from the measuring device to the wall 460 must be correct. If the invention 100 is too close to the wall, the plurality of illuminated dots 400 will be spaced closer together than the user intends. If the invention 100 is too far away, the plurality of illuminated dots 400 will be spaced farther apart than the user intends. A label and/or operating manual (neither of which are shown in the figures) may instruct the user on the proper operating procedures, include the proper distance between the invention 100 and the wall 900.

Figure 7A:
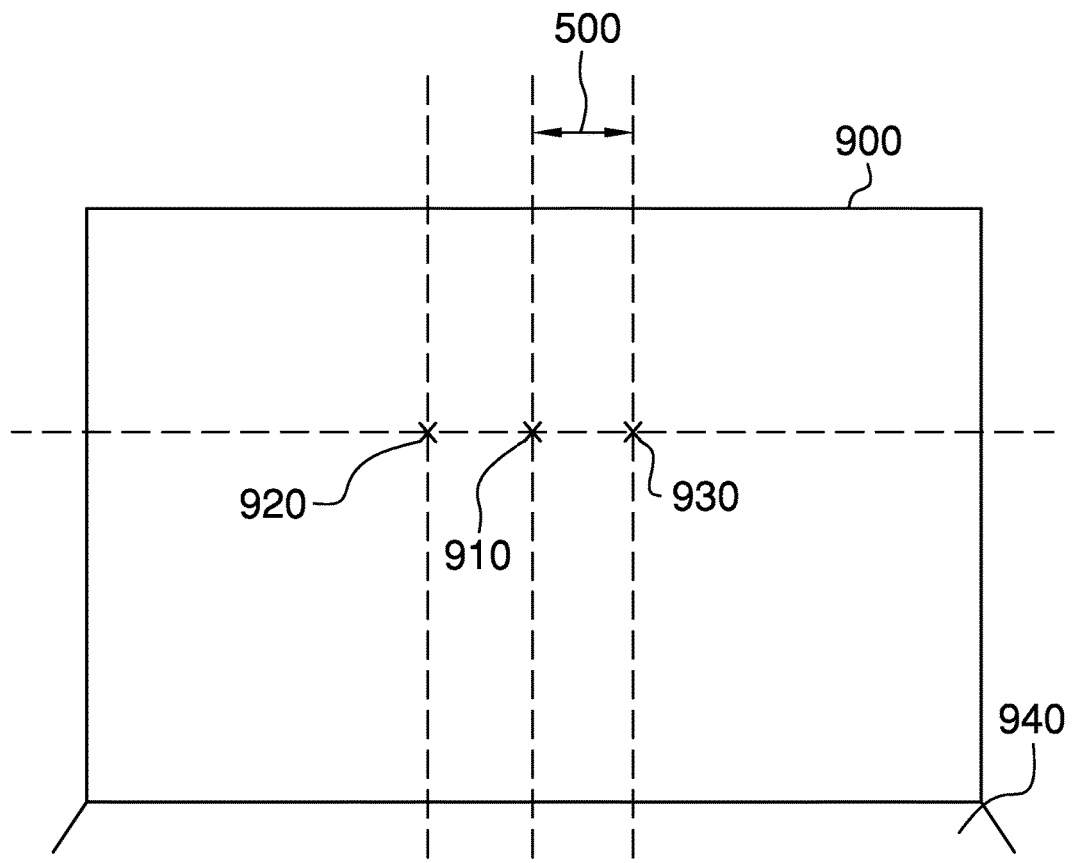
FIG. 7A illustrates a wall with three pencil marks made as a preliminary step in using an embodiment of the disclosure.
Figure 7B:
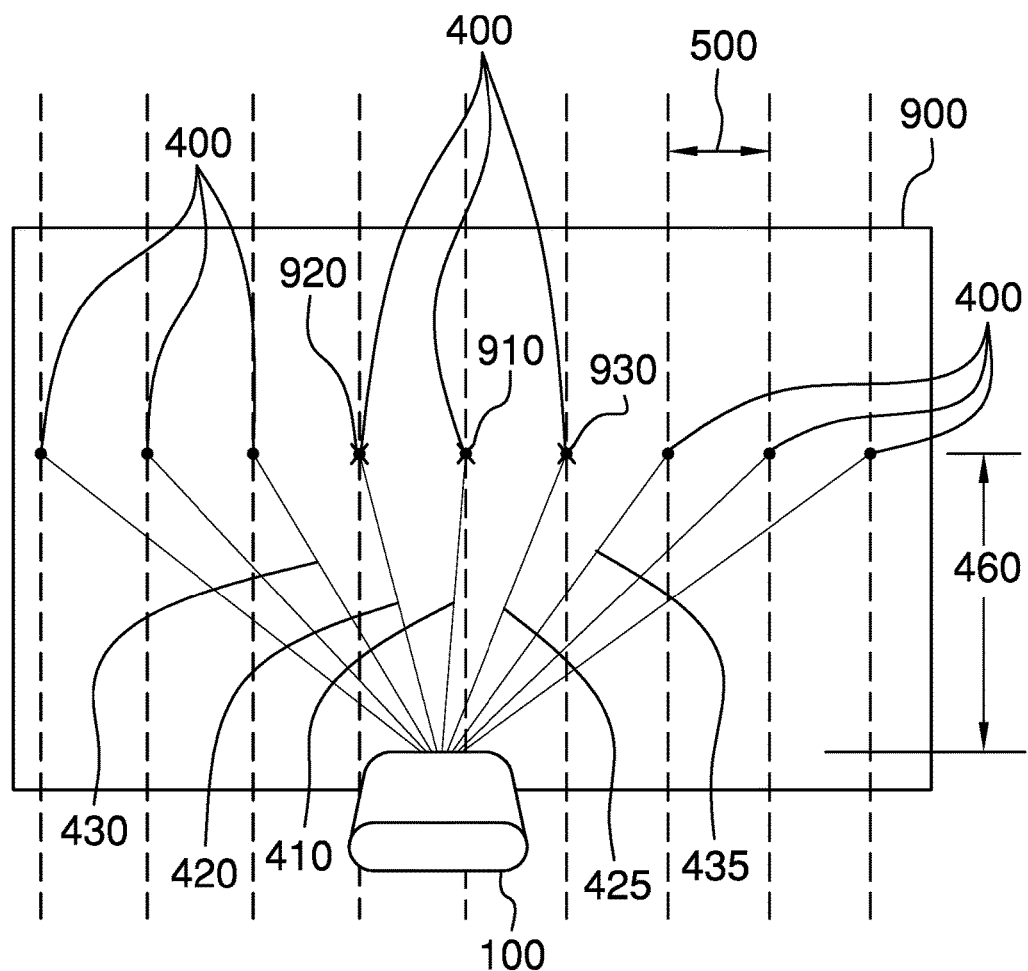
FIG. 7B illustrates an embodiment of the disclosure properly aligned in front of a wall.

Note that in order to achieve the desired spacing of illuminated dots 500 at 16 inches a first distance between the invention 100 and the wall 900 is prescribed. In order to achieve the desired spacing of illuminated dots 500 at 24 inches a second distance between the invention 100 and the wall 900 is prescribed. The second condition is that a center laser beam 410, which coincides with the front to back centerline 470 of the invention 100, must be oriented to be perpendicular to the wall 900. As a non-limiting example, if a side wall is perpendicular to the wall 900 and the user is operating the invention 100 at a distance of 10 ft from the side wall, then the user must aim the center laser beam 410 of the invention 100 at a spot that is on the wall 900 and 10 ft away from the side wall. If the invention 100 is canted away from an orientation that is perpendicular to the wall 900 the geometry changes and the desired spacing of illuminated dots 500 cannot be achieved. (This is illustrated in FIG. 7D.)

As non-limiting examples, if an embodiment of the invention 100 provides the center laser beam 410 having the yaw angle 450 of 0°, a first left-side laser beam 420 having the yaw angle 450 of 5.08° to the left, and a first right-side laser beam 425 having the yaw angle 450 of 5.08° to the right, then with the invention 100 aimed at the wall 900 perpendicularly and the distance from the measuring device to the wall 460 at 15 ft, the first left-side laser beam 420 will strike the wall 900 16 inches to the left of where the center laser beam 410 strikes the wall 900 and the first right-side laser beam 425 will strike the wall 900 16 inches to the right of where the center laser beam 410 strikes the wall 900. Similarly, if a second left-side laser beam 430 has the yaw angle 450 of 10.08° to the left and a second right-side laser beam 435 has the yaw angle 450 of 10.08° to the right, then the first left-side laser beam 420 will strike the wall 900 at 32 inches to the left of where the center laser beam 410 strikes the wall 900 and the second right-side laser beam 435 will strike the wall 900 32 inches to the right of where the center laser beam 410 strikes the wall 900. The yaw angle 450 can be computed for each of the individual laser diode 310 of the plurality of laser diodes 300. Continuing the same non-limiting example, if the distance from the measuring device to the wall 460 is changed from 15 ft to 22.5 ft, then the spacing between each of the plurality of illuminated dots 400 changes from 16 inches to 24 inches.

As an alternative to having to pre-position the invention 100 at a specific distance and orientation in order to have the plurality of illuminated dots 400 show up in the correct locations, the invention 100 may be used in this manner: First, the user must make three pencil marks on the wall 900: a center mark 910, a left mark 920, and a right mark 930. The position of the three pencil marks may be determined using a traditional level and tape measure. (The size of the marks is exaggerated in the figures.) The three marks must be located in a straight line, and level if that is important for the circumstances. Moreover, the three marks must be equally spaced at the desired spacing of illuminated dots 500. (See FIG. 7A.) Next, the user steps away from the wall 900 by an estimated distance of approximately ten feet and the user turns the invention 100 on using the operational control 250. The user then points the invention 100 at the three marks and aligns the invention 100 such that the center laser beam 410 strikes the center mark 910. Then, while keeping the center laser beam 410 aligned on the center mark 910, the user adjusts the position of the invention 100 in terms of the distance from the measuring device to the wall 460 and angular orientation of the center laser beam 410 with respect to the wall 900 in order to have the first left-side laser beam 420 strike the left mark 920 and the first right-side laser beam 425 strike the right mark 930. As illustrated in FIG. 7B, successful alignment of the three center laser beams with the three pencil marks means that the distance from the measuring device to the wall 460 is correct and that a line from the invention 100 to the center mark 910 is perpendicular to the wall 900.

Figure 7C:
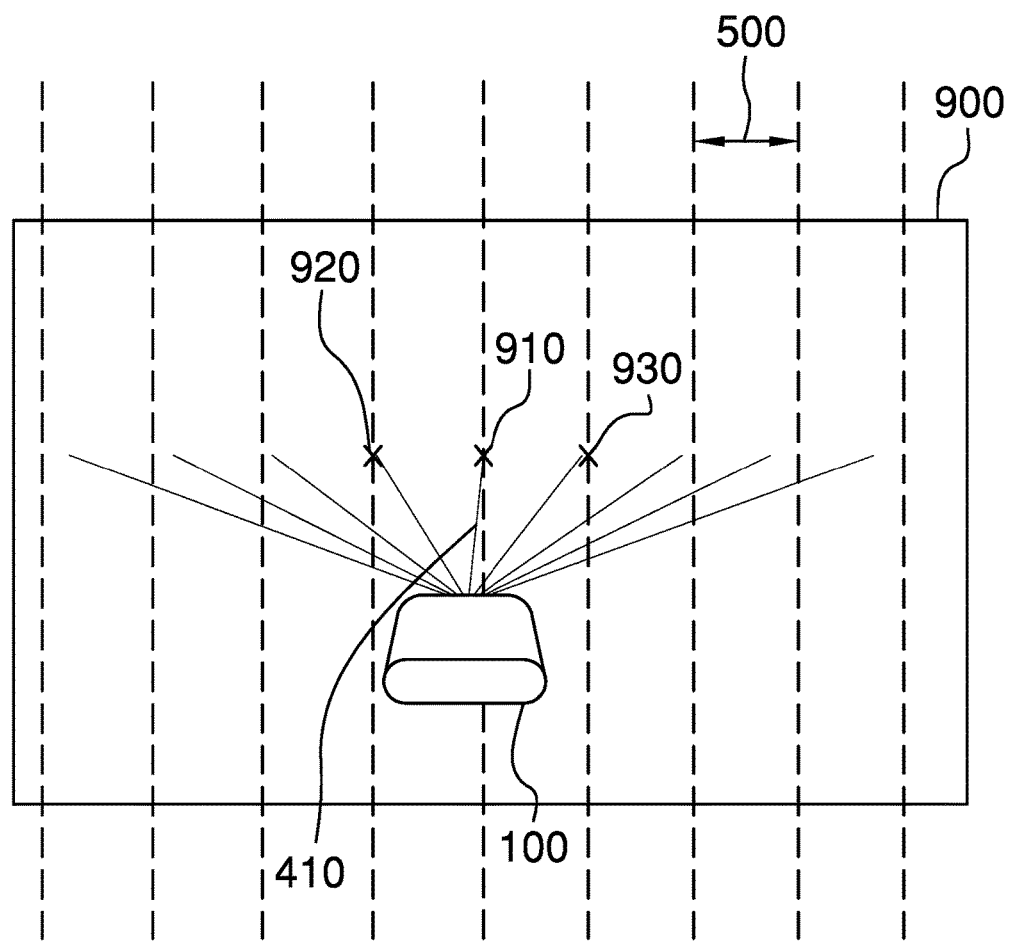
FIG. 7C illustrates an embodiment of the disclosure positioned too closely to a wall.
Figure 7D:
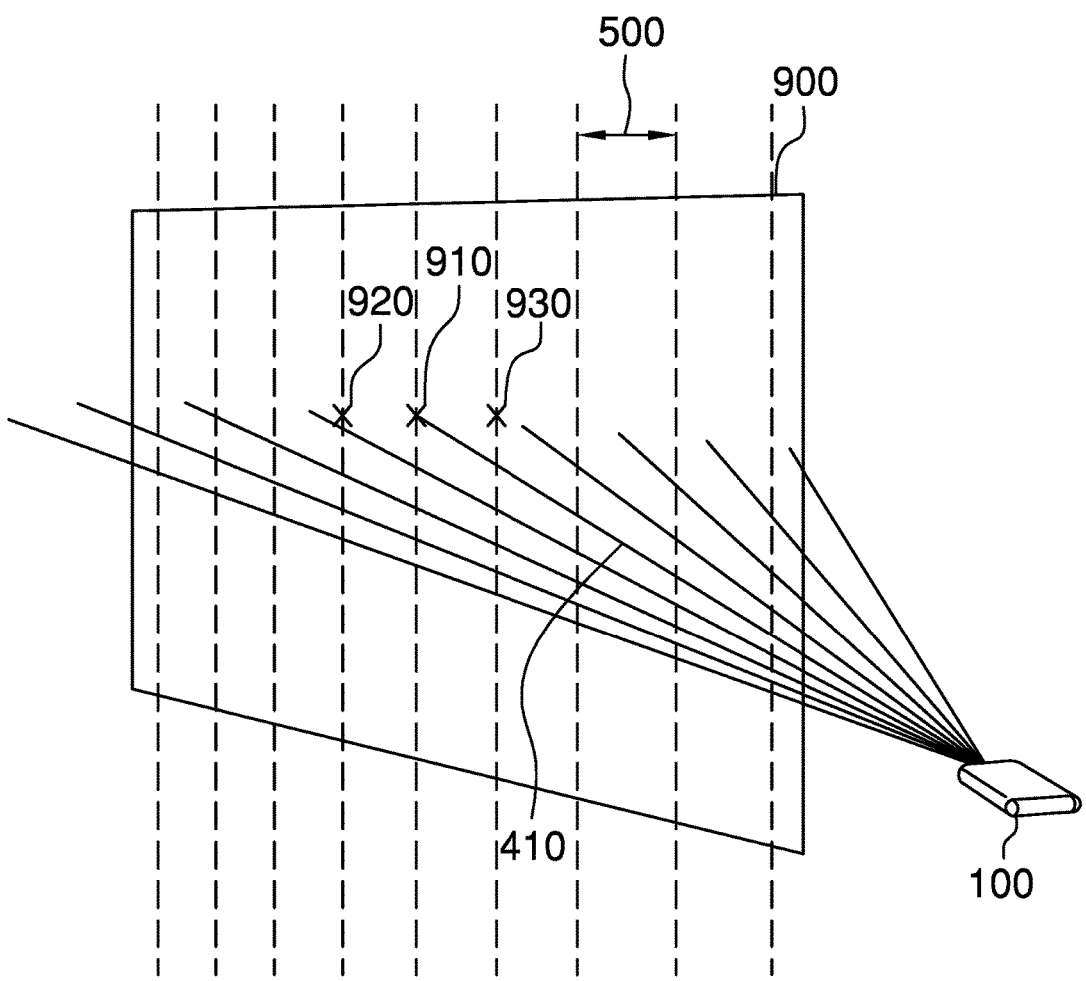
FIG. 7D illustrates an embodiment of the disclosure canted at a non-perpendicular angle with respect to a wall.
Figure 8:
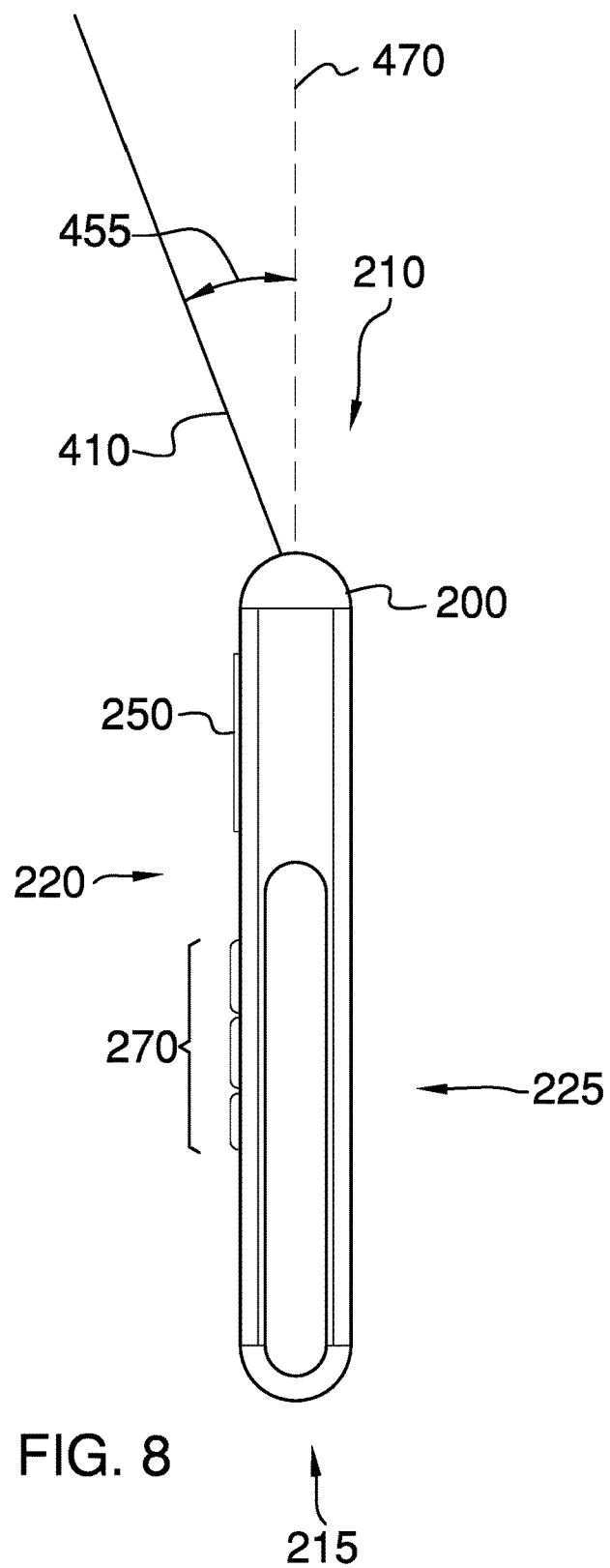
FIG. 8 is a side view of an embodiment of the disclosure illustrating a non-zero pitch angle.

Referring to FIG. 7C, if the invention 100 is too close to the wall 900, the spacing of the three center laser beams where they hit the wall will not match the three pencil marks. The situation where the invention 100 is too far away from the wall 900 is not illustrated but would look very much like FIG. 7C except that the beams would hit outside of the left mark 920 and the right mark 930 instead of inside of the left mark 920 and the right mark 930. FIG. 7D illustrates the invention 100 which is the proper distance away from the wall 900 but is not oriented perpendicular to the wall 900. Again, it is not possible to align the three center laser beams with all three pencil marks. Using this alternative procedure, if the original three marks are spaced 16 inches apart, then the plurality of illuminated dots 400 projected by the invention 100 will all be 16 inches apart and if the original three marks were spaced 24 inches apart then the plurality of illuminated dots 400 projected by the invention 100 will all be 24 inches apart. With the invention 100 positioned to illuminate the three pencil marks the user may place the invention 100 on a tripod, ladder, table, floor, or other support platform to hold the invention 100 in that position while the user marks all of the plurality of illuminated dots 400 with a pencil.

In some embodiments, a pitch angle 455 of the plurality of laser diodes 300 may be modified. The pitch angle 455 is defined to be the angle at which a laser beam leaving the individual laser diode 310 diverges in a top/bottom direction from the line parallel to the centerline 480 and when the line parallel to the centerline 480 passes through the individual laser diode 310. Stated a different way, the pitch angle 455 is perpendicular to the yaw angle 450. By having the pitch angle 455 other than zero degrees, the invention 100 may be placed on a floor 940, and the plurality of illuminated dots 400 may strike the wall 900 well above the level of the floor 940. In some embodiments, the pitch angle 455 may be set to a non-zero value, which is the same for all of the plurality of laser diodes 300 at the time that the invention 100 is manufactured and the pitch angle 455 may never be changed by the user. In some embodiments, a section of the housing 200 may swivel around a left to right axis in order for the user to change the pitch angle 455 for the plurality of laser diodes 300. (This is not illustrated in the figures.)

The operational control 250 is an electrical control that determines whether the plurality of laser diodes 300 are powered. As a non-limiting example, the operational control 250 may be simple push button were a first depression of the button causes the plurality of laser diodes 300 to illuminate and a second depression of the operational control 250 causes the plurality of laser diodes 300 to extinguish. In some embodiments, the operational control 250 may be coupled to a timer circuit (not shown in the figures) located within the housing 200 to conserve life of the one or more batteries 350. In these embodiments, depressing the operational control 250 may activate the timer circuit for a predefined period of time during which the plurality of laser diodes 300 will be illuminated. When the predefined period of time expires, the timer circuit will extinguish the plurality of laser diodes 300.

The one or more batteries 350 are energy storing components that provide power to operate the plurality of laser diodes 300. The one or more batteries 350 may be replaceable batteries, which are exchanged after the energy contained within the one or more batteries 350 has been consumed. If replacement is necessary it may be accomplished by removing a battery cover 240, replacing the one or more batteries 350 with fresh batteries, and then installing the battery cover 240. In some embodiments the one or more batteries 350 may be rechargeable batteries. In those embodiments the battery cover 240 may be omitted and a recharging port (not shown in the figures) may allow attachment of an external recharging adapter to the invention 100.

The housing 200 is an enclosure for the invention 100. The housing 200 comprises the front side 210, a rear side 215, a top face 220, a bottom face 225, the left side 230 and the right side 235. The top face 220 comprises one or more optional controls 270. The one or more optional controls 270 may provide access to additional features of the invention 100. As non-limiting examples, the one or more optional controls 270 may allow the user to change the intensity of the plurality of laser diodes 300, may restrict power such that the individual laser diode 310 receives power only if it is located in one of the center three positions, or may change the setting of a timer that determines how long the plurality of laser diodes 300 will stay on, including the ability to disable the timer and allow the plurality of laser diodes 300 to stay on indefinitely. The bottom face 225 comprises the battery cover 240.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A laser measuring device comprising:
   a plurality of laser diodes, an operational control, one or more batteries and a housing;
   wherein the laser measuring device is activated by depressing the operational control;
   wherein the plurality of laser diodes projects a plurality of illuminated dots onto a wall that the laser measuring device is aimed towards;
   wherein the plurality of illuminated dots defines a straight, level line;
   wherein the plurality of illuminated dots are equally separated by a desired spacing of illuminated dots;
   wherein the housing is an enclosure for the laser measuring device;
   wherein the housing comprises the front side, a rear side, a top face, a bottom face, the left side and the right side;
   wherein the operational control is accessible on the top face of the housing;
   wherein the top face comprises one or more optional controls;
   wherein the one or more optional controls provide access to additional features of the laser measuring device;

wherein the one or more optional controls are adapted to allow the user to change the intensity of the plurality of laser diodes.

2. The laser measuring device according to claim 1 wherein the plurality of laser diodes are mounted onto a circuit board within the housing at a front side of the laser measuring device;
wherein the plurality of laser diodes are mounted in a straight line extending from a left side of the housing to a right side of the housing.

3. The laser measuring device according to claim 2 wherein for each of the plurality of laser diodes, an individual laser diode is set at a yaw angle.

4. The laser measuring device according to claim 3 wherein the plurality of illuminated dots are equally separated by a 16 inches when the laser measuring device is at a first prescribed distance from the wall and is oriented perpendicular to the wall.

5. The laser measuring device according to claim 3 wherein the plurality of illuminated dots are equally separated by a 24 inches when the laser measuring device is at a second prescribed distance from the wall and is oriented perpendicular to the wall.

6. The laser measuring device according to claim 3 wherein a pitch angle of the plurality of laser diodes is a value greater than 0 degrees and less than or equal to 90 degrees.

7. The laser measuring device according to claim 3 wherein the pitch angle is adjustable to any value from 0 degrees to 90 degrees inclusive by swiveling a section of the housing around a left to right axis.

8. The laser measuring device according to claim 3 wherein the operational control is an electrical control that determines whether the plurality of laser diodes are powered.

9. The laser measuring device according to claim 8 wherein the operational control is coupled to a timer to conserve life of the one or more batteries;
wherein depressing the operational control activates the timer circuit for a predefined period of time during which the plurality of laser diodes are illuminated;
wherein when the predefined period of time expires, the timer circuit extinguishes the plurality of laser diodes.

10. The laser measuring device according to claim 8 wherein the one or more batteries are energy storing components that provide power to operate the plurality of laser diodes.

11. The laser measuring device according to claim 10 wherein the one or more batteries are replaceable batteries, which are exchanged after the energy contained within the one or more batteries has been consumed;
wherein replacement of the one or more batteries is accomplished by removing a battery cover, replacing the one or more batteries with fresh batteries, and then installing the battery cover.

12. The laser measuring device according to claim 10 wherein the one or more batteries are rechargeable batteries;
wherein a recharging port is provided on the housing;
wherein the recharging port allows attachment of an external recharging adapter to the laser measuring device.

13. The laser measuring device according to claim 12 wherein the one or more optional controls are adapted to allow the user to change the setting of the timer circuit that determines how long the plurality of laser diodes will stay on;
wherein the one or more optional controls are adapted to allow the user to disable the timer so that the plurality of laser diodes to stay on indefinitely.

14. The laser measuring device according to claim 12 wherein the one or more optional controls are adapted to allow the user to restrict power to only the three center laser diodes.

* * * * *